United States Patent
Eppes

[11] 3,818,602
[45] June 25, 1974

[54] DRYING APPARATUS
[75] Inventor: William R. Eppes, Cary, N.C.
[73] Assignee: Corning Glass Works, Corning, N.Y.
[22] Filed: May 29, 1973
[21] Appl. No.: 364,867

[52] U.S. Cl. ............................ 34/14, 34/17, 34/71, 34/95, 15/100
[51] Int. Cl. ............................................. F26b 5/14
[58] Field of Search ........ 34/9, 14, 17, 95, 71, 95.1, 34/95.3; 15/100, 102

[56] References Cited
UNITED STATES PATENTS

| | | | |
|---|---|---|---|
| 296,049 | 4/1894 | Pearce et al. | 34/9 X |
| 1,881,354 | 10/1932 | Everett | 15/102 |
| 2,474,091 | 6/1949 | Chubb | 34/71 |
| 2,523,080 | 9/1950 | Webb | 34/71 |
| 3,098,249 | 7/1963 | Tile et al. | 15/102 X |
| 3,620,230 | 11/1971 | Foret | 15/100 UX |

*Primary Examiner*—William E. Wayner
*Assistant Examiner*—William C. Anderson
*Attorney, Agent, or Firm*—Clarence R. Patty, Jr.; Walter S. Zebrowski

[57] ABSTRACT

An apparatus and method for continuously drying processed microscope slides wherein excess moisture is first removed from both sides of the slide and thereafter the slide is totally dried by removing the remaining moisture.

10 Claims, 11 Drawing Figures

PATENTED JUN 25 1974
3,818,602

DRYING APPARATUS

BACKGROUND OF THE INVENTION

1. Field of the Invention

The present invention relates to an apparatus and method for drying microscope slides. More specifically, the present invention relates to processed blood slides which are sequentially dried prior to examining such slides with a microscope.

2. Description of the Prior Art

Heretofore, wet processed microscope slides were dried by stacking the slides on an edge in a rack to permit the moisture to drain off by gravity and then subjecting the slides to elevated temperatures. Such procedures required much time resulting in a high cost of processing microscope slides.

SUMMARY OF THE INVENTION

It is the object of the present invention to provide a method and apparatus for drying microscope slides so that the slides are completely dried on both sides in the shortest possible time, and which overcome the aforementioned disadvantages.

Briefly, this invention comprises an apparatus for continuously drying laboratory slides which includes a chamber and means for introducing wet laboratory slides into the chamber in an approximately vertical position along a predetermined path. The travel of the slide is then abruptly intercepted while it is in the approximately vertical position, to remove some of the excess moisture on the slide surfaces.

The slide is then rotated into a horizontal position with the slide specimen being on the top surface of the slide. Means are provided for transporting the slide through the chamber. As the slide is moved through the chamber the bottom surface of the slide is caused to be wiped by a wiper plate to further remove some of the excess moisture therefrom. A stream of air is then directed to the slide while it is supported such that substantially all of both flat surfaces of the slide are exposed to the stream of air. The air is exhausted from the chamber and the dry slide is discharged from the chamber.

Additional objects, features and advantages of the present invention will become apparent to those skilled in the art from the following detailed description and the attached drawings on which, by way of example, only the preferred embodiments of this invention are illustrated.

DETAILED DESCRIPTION OF THE INVENTION

It is to be noted that the drawings are illustrative and symbolic of the present invention and there is no intention to indicate scale, relative proportions, or materials of the elements shown therein.

Figure 1:
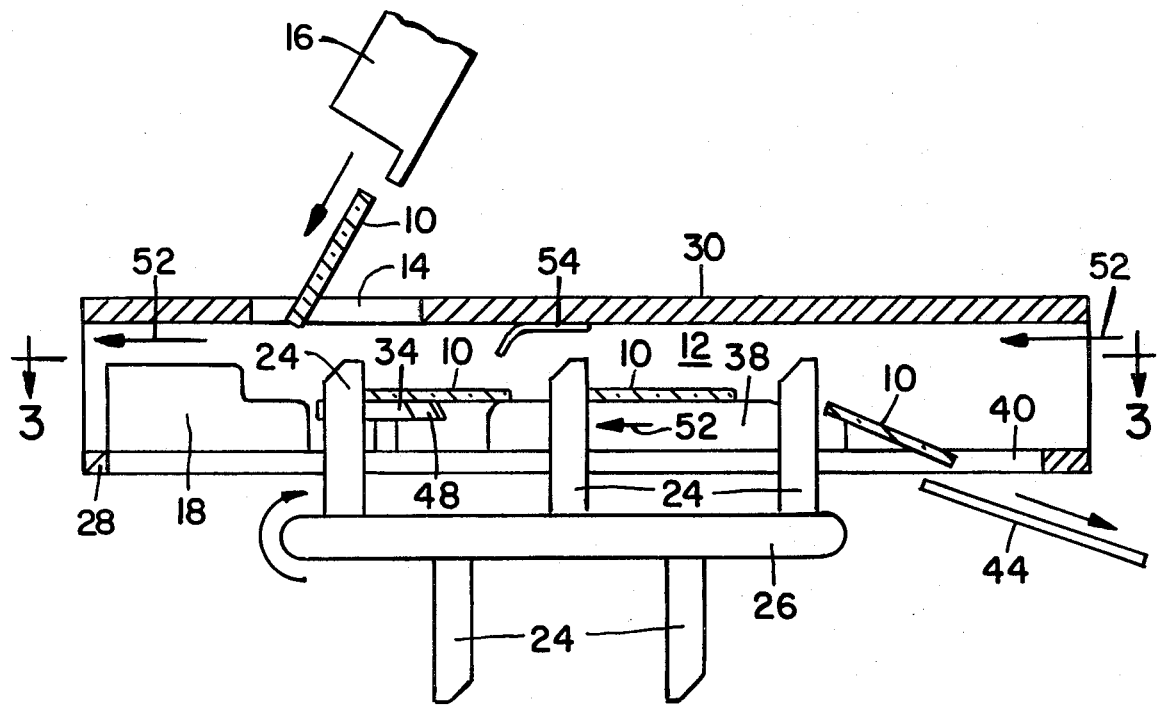
FIG. 1 is a fragmentary elevation partly in section of the drying apparatus of the present invention.

Referring to FIG. 1 there is shown a laboratory slide 10 being introduced into the drying apparatus 12 of the present invention through slide entrance 14 thereto. Wet slides 10 are fed to the drying apparatus from any suitable source 16. As slide 10 is introduced into drying apparatus 12 in an approximately vertical position, it is caused to impinge upon slide stops 18 and thereafter fall by gravity into a horizontal position as illustrated in FIG. 1. By arranging the slides correctly in source 16 and thereafter introducing them into drying apparatus 12 as illustrated in FIG. 1, the slides will be properly oriented when they fall to the horizontal position.

Figure 2:
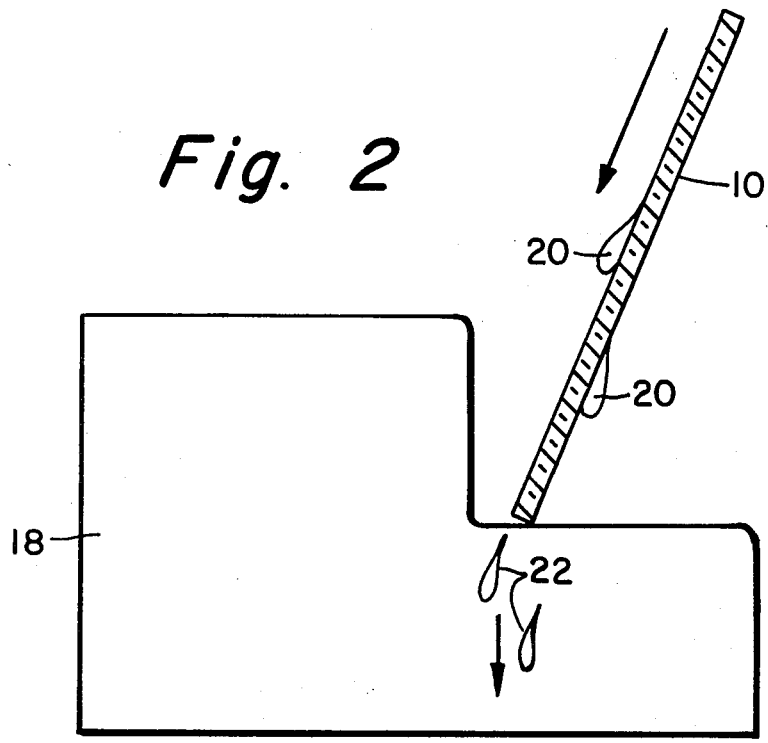
FIG. 2 is a fragmentary illustration of a wet slide striking the slide stops of the present invention.
Figure 11:
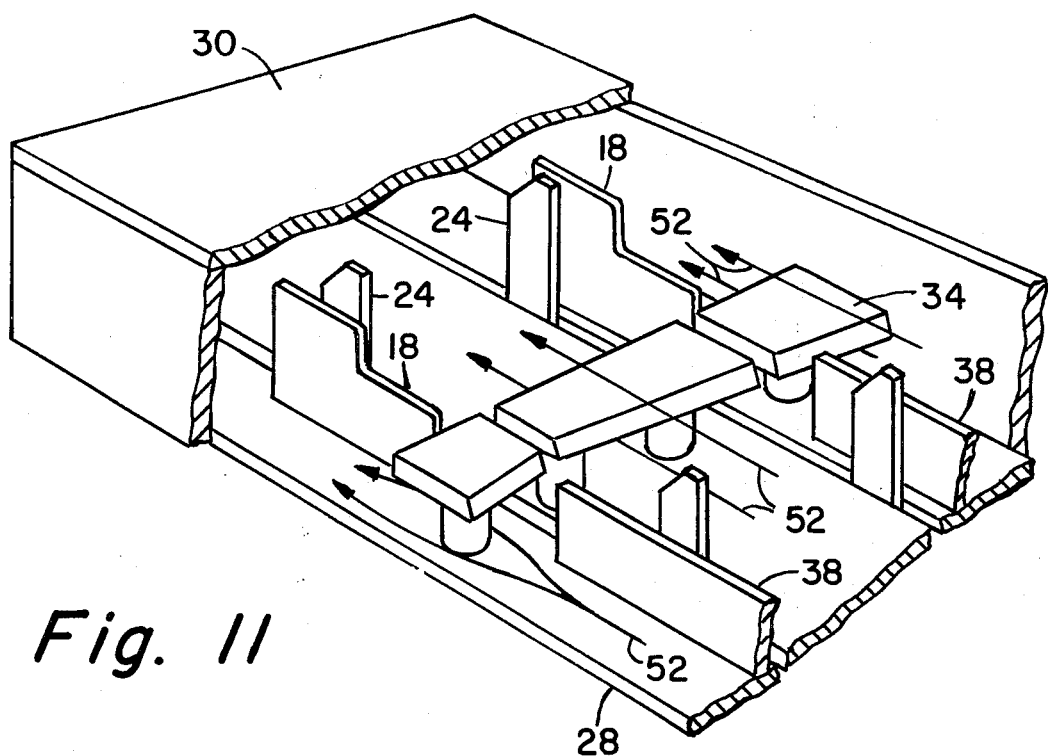
FIG. 11 is a fragmentary oblique view illustrating passage of the airstream through the drying apparatus of the present invention.
Figure 4:
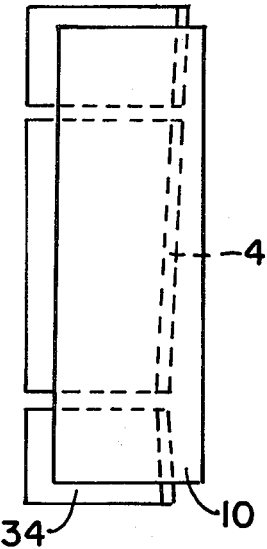
FIGS. 4 through 6 are fragmentary plan views illustrating the removal of some of the excess moisture from the bottom flat surface of a laboratory slide in accordance with the present invention.
Figure 5:
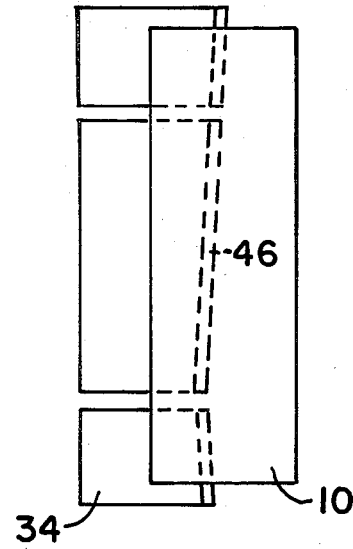
Figure 6:
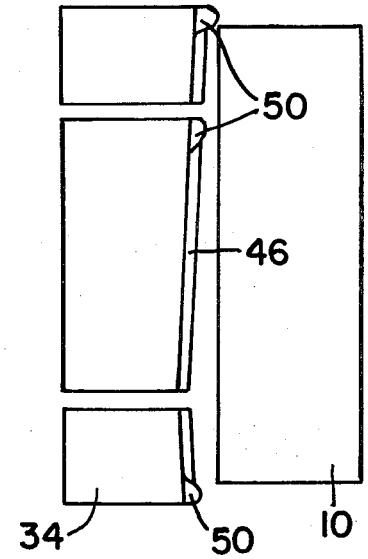
Figure 7:
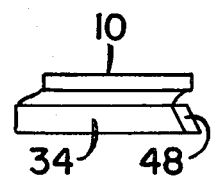
FIGS. 7 through 10 are fragmentary elevation views illustrating the removal of some of the excess moisture from the bottom surface of a laboratory slide in accordance with the present invention.
Figure 8:
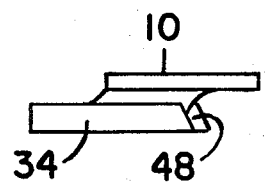
Figure 9:
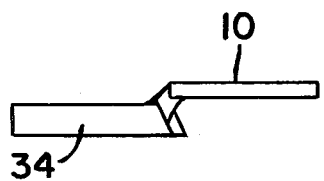
Figure 10:
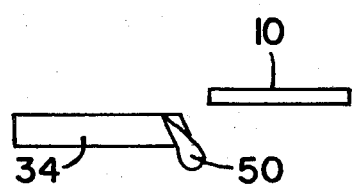

Referring additionally to FIG. 2, it is seen that wet slide 10 having water or other moisture 20 on its flat surfaces is caused to impinge on or strike slide stops 18 whereupon at least some of the excess moisture is removed from the slide by the impingement as illustrated by droplets 22.

Figure 3:
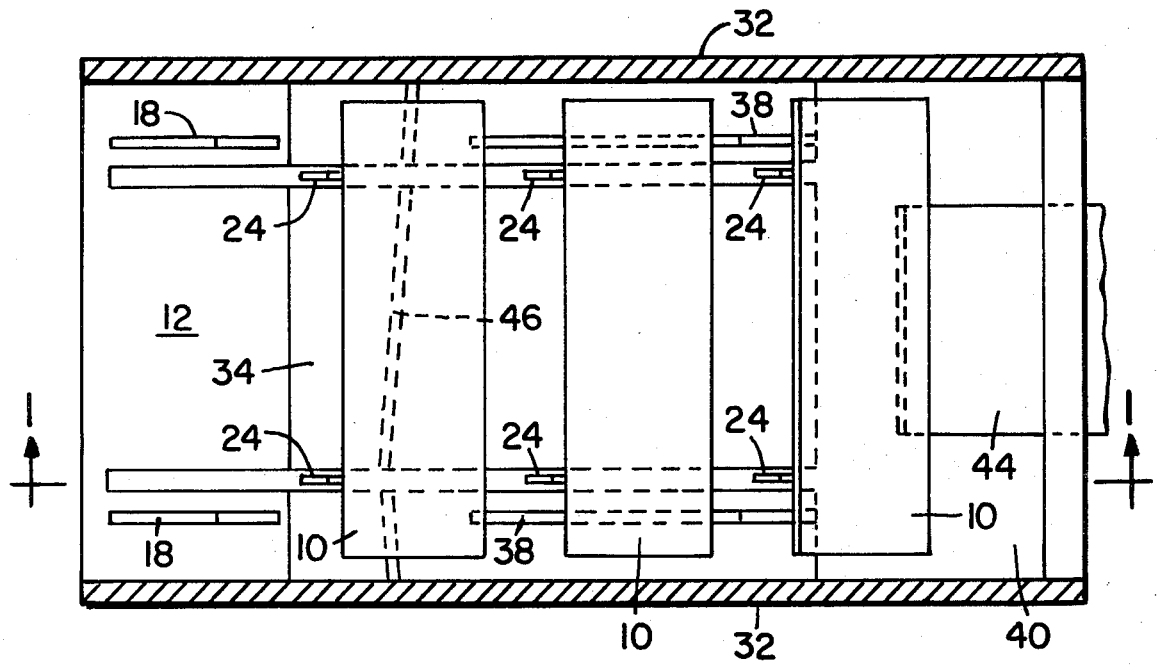
FIG. 3 is a fragmentary cross-sectional plan view of the drying apparatus of the present invention.

Referring to FIGS. 1 and 3, it is seen that the slides are caused to be transported through apparatus 12 by means of slide pushers 24. Slide pushers 24 are illustrated as being attached to a conveyor-like apparatus 26 which causes a pair of pushers 24 to engage each laboratory slide that has been deposited on slide stops 18 and thereafter convey the slide through drying apparatus 12.

The chamber of drying apparatus 12 includes base 28, top 30, and walls 32. Wiper plate 34 mounted on support members 36 is disposed upstream of slide stops 18 in the direction of travel of the slides. The upstream edge of wiper plate 34 in the direction of travel of the slides is tapered or beveled in two directions for the purposes hereinafter described. Adjacent wiper plate 34 and upstream thereof, a pair of support ribs 38 are mounted on chamber base 28. At the discharge end support ribs 38 are tapered to facilitate discharging the laboratory slides through slide discharge opening 40 formed in base 28. One dried slide 10 is illustrated passing through slide discharge opening 40 onto chute 44. As will be understood, when the slides are discharged from the drying apparatus, they may be discharged to any container, subsequent utilization device, or the like as desired, and chute 44 is merely illustrative of one such embodiment.

The operation of the drying apparatus of the present invention is described as follows. When a wet slide 10 is fed to the chamber of drying apparatus 12, it strikes slide stops 18 causing at least some of the excess moisture on the slide to be removed. The slide then drops to the horizontal position as hereinabove described. Thereafter, it is engaged by a pair of slide pushers 24 and is caused to move through the drying apparatus. Referring additionally to FIGS. 4 through 10, it is seen that the bottom surface of slide 10 is caused to be wiped on wiper plate 34. Wiper plate 34 is formed of a material that is highly wettable by water, such for example as glass, and preferably lead glass. The wiper plate is formed with the edge thereof farthest upstream in the direction of travel of the slides, herein called the upstream edge, and the adjacent surface called the upstream surface, being angled. As seen in FIGS. 3 through 6 and 11, the upstream edge 46 of wiper plate 34 is angled. Similarly, as is seen in FIGS. 1 and 7 through 11, the upstream surface 48 of wiper plate 34 is beveled. As the bottom surface of slide 10 is caused to be wiped, the water on the bottom surface tends to collect at upstream edge 46 thereof, and in particular at the upstream corners of the upstream edge as shown by droplets 50 in FIGS. 6 and 10. The water is collected at this upstream edge of wiper plate 34 as a result of capillary attraction and the like. When the slide is finally pushed off of the wiper plate, droplets 50 tend to adhere to wiper plate 34 and flow down its beveled upstream surface 48 and thereafter be exhausted.

As slide 10 is caused to traverse the path through the drying apparatus, its leading edge is pushed onto support ribs 38. A warm airstream is flowed through the chamber of drying apparatus 12 as shown by arrows 52 from any suitable source, not shown, such for example as a fan. The air is exhausted form the present apparatus by any suitable means such as an exhaust port at the end of the apparatus in the direction of the air flow. The passage of the airstream around wiper plate 34 is further illustrated by arrows 52 in FIG. 11. Slide 10 is pushed under air deflector 54 which is attached to chamber top 30 in a position such that the air is deflected down onto the top surface of slide 10.

Since ribs 38 support the laboratory slide at a very small area thereof, substantially both the upper and lower surfaces of slide 10 are exposed to the warm air flowing through the chamber whereby the slide is dried. By controlling the speed at which the slide is transported through the chamber, the slide is fully dried by the time it reaches the slide discharge opening.

As will be understood, the feeding of slides 10 to the drying apparatus through slide entrance 14 is synchronized with the travel of the slides through the drying apparatus chamber so that the next slide is supplied to the apparatus when the previous slide has been pushed along through the chamber sufficiently to make room for said next slide. Therefore it is seen that wet slides are supplied to the drying apparatus, caused to strike the slide stops to remove excess moisture therefrom, caused to be disposed as desired, have the excess moisture further removed therefrom, have the remaining moisture removed so that the slide surfaces are dry, and thereafter be discharged through slide discharge opening 40 to the subsequent utilization apparatus, storage, or the like, as desired.

The following is a typical example of the apparatus and method of the present invention with reference to the drawings. Blood slides from a suitable blood slide stainer are supplied to the drying apparatus of the present invention, caused to strike the slide stops to shake excess moisture therefrom, and be disposed substantially horizontally therein with the blood sample on the upper surface of the slide. More excess water from the slide is wiped off by a lead glass wiper plate disposed within the drying apparatus chamber. The slide is caused to move through the chamber at a speed of approximately 1.5 inches per minute. The flat surfaces of the slide are exposed to an airstream at a temperature of approximately 54°C. and a velocity of approximately 100 feet per minute. This airstream is deflected by an air deflector so that it is directed at the slide. The slide is fully dried by the airstream as it is pushed to the slide discharge opening and is within the drying apparatus for about 2¼ minutes. The resulting slide is then ready for examination.

As will be understood, feeding of the slides to the drying apparatus must be synchronized with the movement of the slides through the apparatus as hereinabove described. It is also necessary that the glass slide be pushed substantially onto support ribs 38 before the next slide is supplied to the apparatus to prevent said next slide from being blown into a vertical position by the airstream.

Although the present invention is described with respect to specific details of certain embodiments thereof, it is not intended that such details be limitations upon the present invention except insofar as is set forth in the following claims.

I claim:

1. An apparatus for continuously drying laboratory slides comprising
   a chamber,
   means for introducing a wet laboratory slide into said chamber in an approximately vertical position along a predetermined path, said slide having two substantially flat parallel surfaces and a specimen adhered to one of said surfaces,
   means disposed at the end of said path for intercepting said slide while it is in said approximately vertical position thereby removing some of the excess moisture therefrom,
   means for transporting said slide through said chamber in a substantially horizontal position with said slide specimen being disposed on the top surface of said slide,
   a wiper plate disposed within said chamber, the bottom surface of said slide being wiped by said wiper plate to further remove some of the excess moisture therefrom,
   means within said chamber for supporting said slide so that substantially all of both of said flat surfaces are exposed,
   means for directing a stream of air over both of said exposed flat surfaces of said slide,
   means for exhausting said air from said chamber, and
   means for discharging said slide from said chamber.

2. The apparatus of claim 1 wherein said means for introducing are synchronized with said means for transporting.

3. The apparatus of claim 1 wherein said means for transporting comprise a pair of slide pusher members disposed to engage the trailing edge of said slide.

4. The apparatus of claim 1 wherein one edge of said wiper plate is at an angle with respect to the longitudinal axis of said slide.

5. The apparatus of claim 4 wherein the surface at said one edge of said wiper plate is beveled.

6. The apparatus of claim 1 wherein said means for exhausting comprise at least one exhaust port.

7. A method of drying a laboratory slide comprising the steps of
   introducing a wet laboratory slide into a chamber in an approximately vertical position along a predetermined path, intercepting the travel of said slide along said path while it is in said approximately vertical position to remove some of the excess moisture therefrom, transporting said slide through said chamber in a substantially horizontal position, passing said slide over a wiper plate to further remove some of the excess moisture from the bottom surface thereof, supporting said slide so that substantially both flat surfaces thereof are exposed, directing a stream of air over said both of said surfaces of said slide, exhausting said air from said chamber, and discharging said slide from said chamber.

8. The method of claim 7 wherein the step of directing a stream of air comprises impinging a stream of air on an air deflector.

9. The method of claim 7 wherein said step of introducing a wet laboratory slide is synchronized with the step of transporting said slide through said chamber.

10. The method of claim 7 further comprising the step of rotating said slide to the horizontal position before transporting said slide through said chamber.

* * * * *